No. 794,402. PATENTED JULY 11, 1905.
G. GOLDMAN.
MOISTURE CARRYING BELT.
APPLICATION FILED SEPT. 22, 1904.

No. 794,402. Patented July 11, 1905.

UNITED STATES PATENT OFFICE.

GUSTAV GOLDMAN, OF BALTIMORE, MARYLAND.

MOISTURE-CARRYING BELT.

SPECIFICATION forming part of Letters Patent No. 794,402, dated July 11, 1905.

Application filed September 22, 1904. Serial No. 225,539.

*To all whom it may concern:*

Be it known that I, GUSTAV GOLDMAN, of Baltimore, Maryland, have invented a new and useful Moisture-Carrying Belt, which invention is fully set forth in the following specification.

This invention relates to means for carrying water or other liquid into positions where it can be advantageously employed in the treatment of other bodies. For example, it is found desirable in the manufacture of many products to subject them to the action of steam during the process of manufacture, and for this purpose the product, together with the moisture, is brought into juxtaposition with a heated surface which converts the moisture into steam. Such use of moisture is disclosed in my United States Patent No. 758,246 in the manufacture of matted or felted fibrous masses.

The object of the present invention is to provide a means for use in evenly and automatically applying the moisture to various surfaces or bodies.

With this object in view the invention consists in a moisture-carrying belt composed of a backing of requisite strength and to which there is quilted or otherwise suitably secured a layer of absorbent material, as absorbent cotton. The backing may be and preferably is composed of canvas, and the absorbent cotton or other absorbent material is secured thereto by staggered rows of stitches, or it may be sewed thereto in the usual manner of quilting.

One method of using such a belt is to pass it through a tank or reservoir containing the moisture and then advance it to the point where such moisture is to be applied, and for the purpose of permitting the escape of all the liquid which is not retained by the absorbent material the belt is perforated or provided with numerous holes. Not only do these holes or perforations afford a means for the escape of the superfluous liquid, but they also afford a ready means for the passage of the heat to the body of the belt and to the material treated when said belt is passed over heated rollers to convert the moisture carried thereby into steam.

The invention is illustrated in the accompanying drawings, in which—

Figure 1:
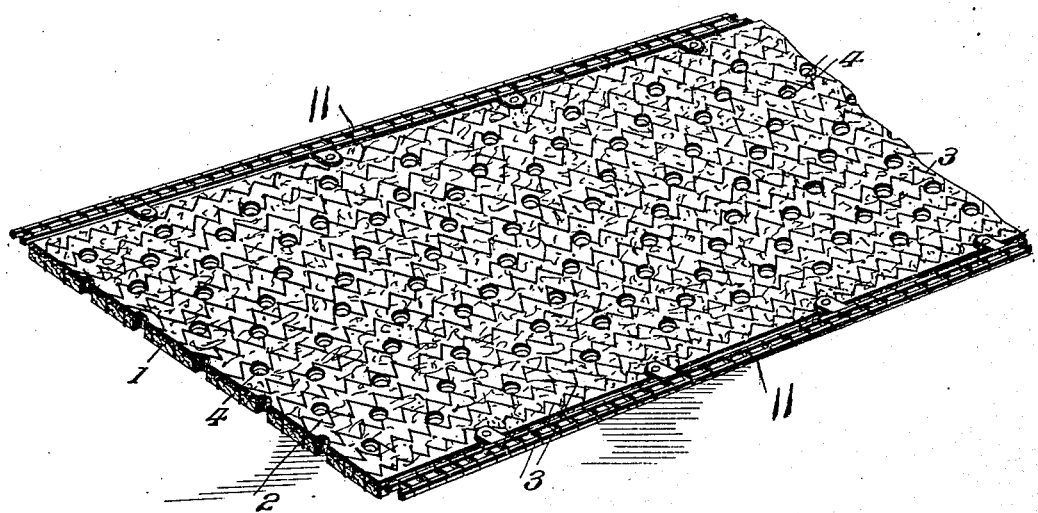
Figure 2:
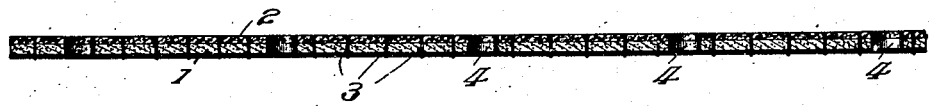

Figure 1 is a perspective view of a portion of the belt. Fig. 2 is a transverse section thereof; and Fig. 3 is a diagrammatic view, on a reduced scale, of the belt in use.

Referring to the drawings, 1 is a backing of any suitable material, such as canvas, to which a layer 2 of any suitable absorbent material, as absorbent cotton, is secured, preferably by quilting or other forms of stitches 3. In the present instance the absorbent material is shown as stitched to the backing by rows of zigzag stitches. Holes or perforations 4 are formed throughout the extent of the belt, through which excess of moisture permitted to pass, and thus escape from the belt. Another important function of these perforations 4 is that the steam, generated when heat is applied to the belt, passes through them, and thus more readily reaches the material which it is desired to treat than would be the case if the belt were imperforate.

As a convenient means of driving the belt it is provided with sprocket-chains 11 11, secured to the sides thereof. One advantage of employing some driving means like the sprocket-chains 11 11 or their equivalent lies in the fact that the belt itself need not be placed under such tension as it passes over the driving-roller, thereby avoiding strain on the belt and also avoiding the squeezing out of the water in the absorbent material.

Figure 3:

In Fig. 3 is shown one manner of using the belt. The belt 5 is passed around an idler-roller 6 at one end and a steam-heated driving-roller 7 at the other end. Above the roller 7 is mounted a roller 8, which may or may not be heated, as may be deemed most advisable. At some suitable point along the belt suitable means for supplying moisture thereto is provided. As shown in Fig. 3, water-pipes 9 9, having jet-openings which direct the water onto the belt, are employed for this purpose. The material 10 to be treated is passed between the rollers 7 and 8, together with the belt 5, and the water in the belt is converted into steam, which is thus applied to the material.

While in the foregoing description refernce has been principally had to the use of the belt for the purpose of carrying moisture to a surface or material where said moisture is to be applied, it will be apparent that instead of supplying the belt with moisture to be carried to a given surface the belt may be used to absorb moisture from a given surface and carry it away from the same, the moisture being evaporated from the belt by any suitable means for applying heat—such, for example, as a steam-heated roller or table. It will therefore be understood that the belt may be either a moisture-supplying or moisture-abstracting belt, as the case may be.

Having thus described my invention, what is claimed is—

1. A belt having a body of moisture-absorbing material stitched or otherwise secured thereto, with perforations extending through the belt.

2. A belt composed of a suitable fabric and a moisture-absorbing material stitched or otherwise secured thereto, with perforations extending through said fabric and absorbent material.

3. A belt composed of a fabric backing with absorbent material secured thereto, combined with a device on each edge of the belt for applying power to drive the same.

4. A belt composed of a fabric backing with absorbent material secured thereto, combined with sprocket-chains attached to the edges of the belt.

5. A belt composed of a perforated fabric having absorbent material secured thereto, combined with sprocket-chains attached to the edges of the belt.

6. A belt composed of a fabric having absorbent cotton stitched thereto.

7. A canvas belt having a layer of absorbent cotton stitched thereto.

8. A canvas belt having a layer of absorbent cotton stitched thereto, with perforations extending through the canvas and absorbent cotton, combined with sprocket-chains secured to the edges of said belt.

In testimony whereof I have signed this specification in the presence of two subscribing witnesses.

GUSTAV GOLDMAN.

Witnesses:
   S. T. CAMERON,
   REEVE LEWIS.